United States Patent
Giakouminakis et al.

(10) Patent No.: US 9,411,965 B2
(45) Date of Patent: *Aug. 9, 2016

(54) METHODS AND SYSTEMS FOR IMPROVED RISK SCORING OF VULNERABILITIES

(71) Applicant: Rapid7 LLC, Boston, MA (US)

(72) Inventors: Anastasios Giakouminakis, Allendale, NJ (US); Sheldon E Malm, Mississauga (CA); Chad Loder, Los Angeles, CA (US); Richard D Li, Sommerville, VA (US)

(73) Assignee: Rapid7 LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,107

(22) Filed: Sep. 22, 2015

(65) Prior Publication Data

US 2016/0012236 A1    Jan. 14, 2016

Related U.S. Application Data

(63) Continuation of application No. 13/298,586, filed on Nov. 17, 2011, now Pat. No. 9,141,805.

(60) Provisional application No. 61/535,723, filed on Sep. 16, 2011.

(51) Int. Cl.
*G06F 21/57* (2013.01)
*H04L 29/06* (2006.01)

(52) U.S. Cl.
CPC .............. *G06F 21/577* (2013.01); *G06F 21/57* (2013.01); *H04L 63/1433* (2013.01)

(58) Field of Classification Search
CPC .... G06F 21/577; G06F 21/57; H04L 63/1433
See application file for complete search history.

(56) References Cited

U.S. PATENT DOCUMENTS

| 7,552,480 | B1* | 6/2009 | Voss ...................... G06F 21/577 380/277 |
| 8,286,239 | B1* | 10/2012 | Sutton ................. H04L 63/0227 726/22 |
| 2003/0056116 | A1 | 3/2003 | Bunker et al. |
| 2003/0233438 | A1 | 12/2003 | Hutchinson et al. |
| 2004/0064726 | A1 | 4/2004 | Girouard |
| 2004/0193918 | A1 | 9/2004 | Green et al. |
| 2004/0250115 | A1 | 12/2004 | Gemmel et al. |
| 2005/0086530 | A1* | 4/2005 | Goddard ............... G06F 11/008 726/4 |

(Continued)

OTHER PUBLICATIONS

Karabey et al., Information security metric integrating enterprise objectives, Oct. 2009, 43rd Annual 2009 International Carnahan Conference on Security Technology, pp. 144-148.*

(Continued)

*Primary Examiner* — Kenneth Chang
(74) *Attorney, Agent, or Firm* — MH2 Technology Law Group, LLP

(57) ABSTRACT

A security tool can identify vulnerabilities in a computing system and determine a risk level of the vulnerabilities based on base and optional CVSS vectors and additional factors that represent the evolving nature of vulnerabilities. Likewise, the security tool can determine an overall risk for vulnerabilities, an asset, and/or a collection of assets that encompasses a global view of an asset's risk and/or collection of assets' risk, business considerations of an entity that own and controls the asset and/or the collection of assets, and the entity's associations.

27 Claims, 5 Drawing Sheets

(56) References Cited

U.S. PATENT DOCUMENTS

| | | |
|---|---|---|
| 2005/0187963 A1 | 8/2005 | Markin |
| 2006/0005245 A1 | 1/2006 | Durham et al. |
| 2006/0136327 A1 | 6/2006 | You |
| 2006/0191012 A1* | 8/2006 | Banzhof .............. G06F 21/577 726/25 |
| 2006/0195905 A1 | 8/2006 | Fudge |
| 2006/0259974 A1* | 11/2006 | Marinescu ............. G06F 21/56 726/25 |
| 2006/0265751 A1 | 11/2006 | Cosquer et al. |
| 2007/0186283 A1 | 8/2007 | Brumbaugh et al. |
| 2008/0028470 A1* | 1/2008 | Remington ............ G06F 21/33 726/25 |
| 2008/0104276 A1 | 5/2008 | Lahoti et al. |
| 2008/0301779 A1 | 12/2008 | Garg et al. |
| 2009/0018885 A1* | 1/2009 | Parales ............... G06Q 10/0635 705/7.28 |
| 2010/0169948 A1 | 7/2010 | Budko et al. |
| 2010/0332889 A1 | 12/2010 | Shneorson et al. |
| 2011/0178942 A1 | 7/2011 | Watters et al. |
| 2011/0191854 A1 | 8/2011 | Giakouminakis et al. |
| 2012/0110667 A1 | 5/2012 | Zubrilin et al. |
| 2012/0144492 A1* | 6/2012 | Griffin .................... G06F 21/56 726/25 |

OTHER PUBLICATIONS

Chiang, Frank et al. Risk and Vulnerability Assessment of Secure Autonomic Communication Networks, Aug. 2007, The 2nd International Conference on Wireless Broadband and Ultra Wideband Communications, pp. 40-45.

Mell, Peter et al. A Complete Guide to the Common Vulnerability Scoring System Version 2.0. Common Vulnerability Scoring System (v2). Jun. 2007, pp. 1-23.

Li, Richard D. et al. System and Methods for Identifying Virtual Machines in a Network. U.S. Appl. No. 13/218,606, filed Aug. 26, 2011.

Li, Richard D. et al. Systems and Methods for Performing Vulnerability Scans on Virtual Machines. U.S. Appl. No. 13/218,705, filed Aug. 26, 2011.

* cited by examiner

METHODS AND SYSTEMS FOR IMPROVED RISK SCORING OF VULNERABILITIES

CROSS-REFERENCE TO RELATED APPLICATIONS

This application is a continuation of U.S. application Ser. No. 13/298,586 filed Nov. 17, 2011 (now U.S. Pat. No. 9,141, 805) which claims priority to U.S. Provisional Patent Application Ser. No. 61/535,723 filed on Sep. 16, 2011, the disclosures of which are incorporated in their entirety by reference herein.

FIELD

Aspects of the disclosure relate generally to computer security.

DESCRIPTION OF THE RELATED ART

In today's distributed computing environments, security is of the utmost importance. Due to the rise of wide-area public networks, users have unlimited access to content, e.g. data, files, applications, programs, etc., from a variety of sources. Additionally, the users' connection to the public networks provides a window for malicious entities to attack the users' computing systems. Malicious entities utilize this ease of accessibility and anonymity to attack the users. For example, the malicious entities can plant viruses, Trojans, or other malicious agents in publicly available content in order to attack the users' computing systems and steal sensitive information from the users and can attack the users' systems remotely across the public networks.

To attack a user's computing system, a malicious entity will utilize a vulnerability in a user's computing system. A vulnerability can be any type of weakness, bug, and/or glitch in the software and hardware of a computing system. Accordingly, users can desire to identify any vulnerabilities in their computing systems and the risk that the vulnerabilities pose.

Risk that a vulnerability poses is traditionally described as the product of likelihood of a loss event and the impact of a loss event. In Information Risk and Vulnerability Assessment, these factors are understood as six vectors that form the basis of the Common Vulnerability Scoring System (CVSS). The CVSS also defines additional "optional" vectors that can assess the context-sensitivity of the impact of a loss event in a particular environment and the fact that likelihood of successful attack via a particular vulnerability changes over time.

The CVSS does afford the ability to rank one vulnerability against another, but nuanced organizational analysis has proved problematic, partly due to the ordinal nature of the scoring system, and partly due to large gaps in the underlying metrics. Further, the CVSS does not scale: it is meant to perform analysis at the vulnerability level, but does not scale to asset level or asset group level analysis. Nor does the CVSS facilitate any sense of indirect impact or likelihood involving integrated or adjacent organizations.

Most importantly, it does not account for numerous factors that increase or mitigate risk that must be taken into consideration to truly understand an organization's risk posture—factors that have proven to play a role just as strong as the base, environmental, and temporal vectors that comprise the CVSS. In fact, as the threat landscape continues to evolve, one can argue that the original base vectors have become less important in assessing likelihood of attack than new vulnerability metrics that recent research has yielded.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for determining the risk for vulnerabilities and overall risk for vulnerabilities, assets, and collections of assets. In particular, a security tool can identify vulnerabilities in a computing system and determine a risk level of the vulnerabilities based on base and optional CVSS vectors and additional factors that represent the evolving nature of vulnerabilities. Likewise, the security tool can determine an overall risk for vulnerabilities, an asset, and/or a collection of assets that encompasses a global view of an asset's risk and/or a collection of assets' risk, business considerations of an entity that owns and controls the asset and/or collection of assets, and the entity's associations. Accordingly, the security tool can, in real time, identify and analyze security threats to a computing system and provide details of vulnerabilities that accurately represent the threats to a user.

Figure 1:
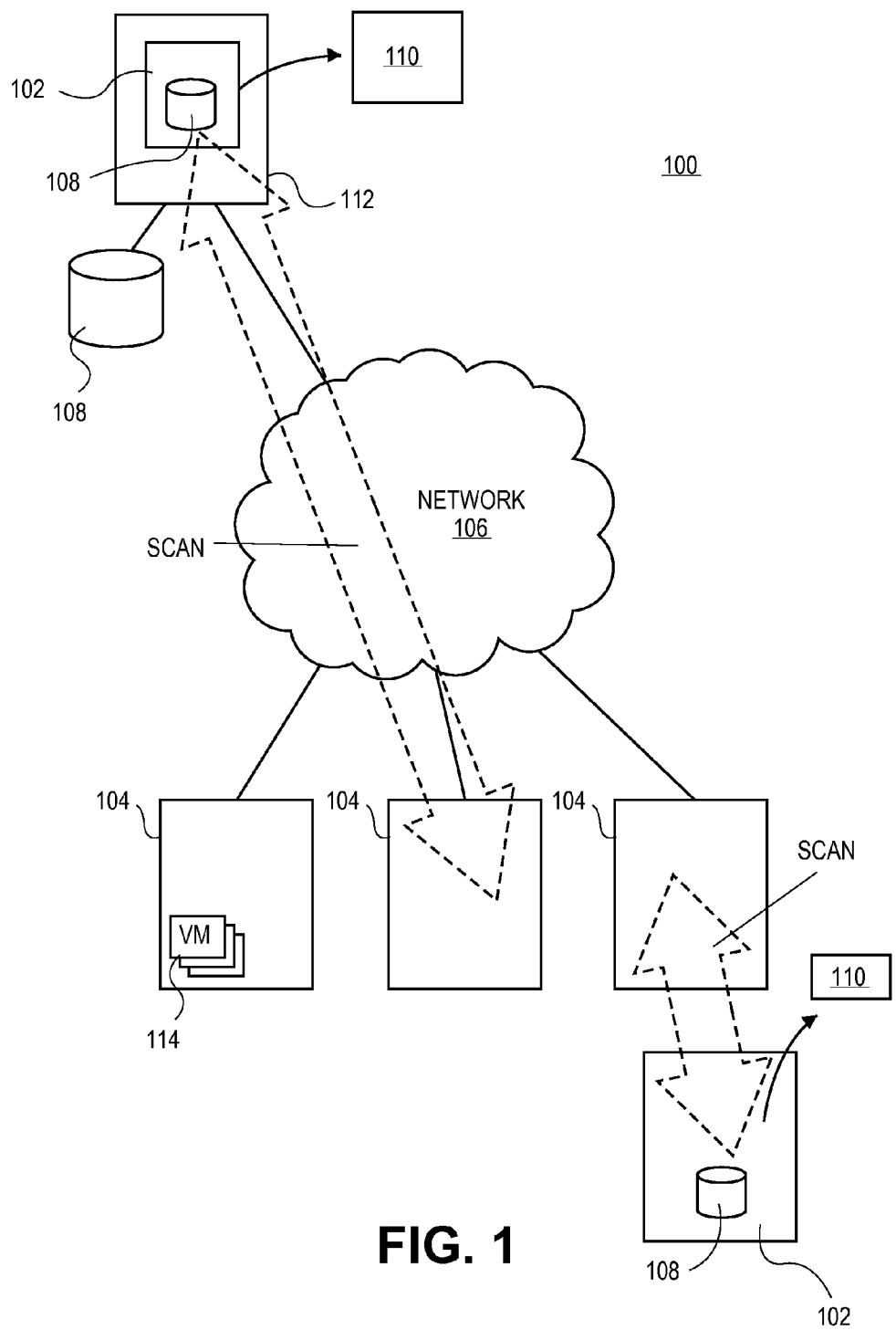
FIG. 1 is block diagram of an exemplary environment in which a security tool can test and analyze assets, according to various embodiments.

FIG. 1 illustrates an exemplary environment 100 in which a security tool 102 can identify and analyze vulnerabilities in assets and can determine the risk of the vulnerabilities to the assets. While FIG. 1 illustrates various systems contained in the environment 100, one skilled in the art will realize that these systems are exemplary and that the environment 100 can include any number and type of systems.

As illustrated in FIG. 1, the environment 100 can represent the systems of public or private entities, such as governmental agencies, individuals, businesses, partnerships, companies, corporations, etc., utilized to support the entities. The environment 100 can include a number of assets, such as the computing system 104 that are owned and operated by the entities. The computing systems 104 can be any type of conventional computing systems, such as desktops, laptops, servers, etc. The computing systems 104 can include hardware resources, such as processors, memory, network hardware, storage devices, and the like, and software resources, such as operating systems (OS), application programs, and the like.

In addition to the physical computing systems, the assets can include one or more virtual machines (VMs) 114 that are hosted by one or more of the computing systems 104. In particular, the VMs 114 can be any software implementation of a machine or computer that can execute a program or application using underlying hardware of the computer systems 104. In embodiments, the VMs 114 can be system VMs capable of executing a complete operating system (OS) or process VMs capable of executing one or more programs or applications. It should be appreciated that the number, type, functionality, and extent of each of the VMs 114 can vary based on the computer systems 104, any requirements, or other factors. To operate on the computer systems 104, the VMs 114 can be configured to communicate with a hypervisor or other logic to access resources of the computer systems 104.

The computing systems 104 in the environment 100 can be located at any location, whether located at single geographic location or remotely located from each other. For example, the computing systems 104 can represent the computing systems of a company that is located in multiple geographic locations. As such, one or more of the computing systems 104 can be located at one location (e.g. one office of the company) and one or more of the computing system 104 can be located at one or more different locations (e.g. satellite offices of the company). In order to communicate and share data, the computing systems 104 can be coupled to one or more networks 106. The one or more networks 106 can be any type of communications networks, whether wired or wireless, to allow the computing system to communicate, such as wide-area networks or local-area networks.

In embodiments, the owners, administrators, and users of the computing systems 104 can desire to test and analyze the security of the computing systems 104. To achieve this, the security tool 102 can be utilized to test and analyze the security of the computing systems 104 and/or the VMs 114. The security tool 102 can be configured to run on one or more of the computing systems 104. The security tool 102 can be configured to identify vulnerabilities in the computing system 104 and/or the VMs 114 and to analyze the vulnerabilities in the computing systems 104 and/or the VMs 114 in order to determine a risk level the vulnerabilities pose to the computing systems 104 and/or the VMs 114. A vulnerability can be any type of weakness, bug, and/or glitch in the software resources and/or hardware resources of the computing system 104 and/or the software resources of the VMs 114 that can allow the security of the computing system 104 and/or the VMs 114 to be compromised. For example, a vulnerability in the software resources can include, for example, software that is out of date, software that has known security weakness, configurations of software that have known security weaknesses, known bugs of software, etc. Likewise, a vulnerability in the hardware resources can include, for example, known bugs in hardware, configurations of hardware that have known security weaknesses, etc.

In embodiments, in order to identify a vulnerability, the security tool 102 can be configured to examine a computing system 104 to identify the software resources and the hardware resources of the computing system 104. Likewise, the security tool 102 can be configured to examine the VMs 114 to identify the resources of the VMs 114. For example, the security tool 102 can be configured to scan the computing systems 104 in order to identify the details of the software resources of the computing systems (type of software installed, e.g. OS and application programs, version of the software installed, configuration of the software installed, etc.) and the details of the hardware resources (type of hardware, configuration of the hardware, etc.). Additionally, the security tool 102 can be configured to communicate with a vulnerability scanner, which can operate on the computer systems 104, to identity the vulnerabilities. Likewise, the security tool 102 can be configured to scan the VMs 114 in order to identify the details of the VMs 114. Examples of scanning and identifying vulnerabilities in VMs can be found in: Systems and Methods for Identifying Virtual Machines in a Network, U.S. patent application Ser. No. 13/218,606, U.S. Patent Application Publication No. 20130055246, invented by Richard Li, Jeffrey Berger, and Anastasios Giakouminakis, assigned to Rapid7, LLC; and Systems and Methods for Performing Vulnerability Scans on Virtual Machines, U.S. patent application Ser. No. 13/218,705, U.S. Patent Application Publication No. 20130055398, invented by Richard Li, Jeffrey Berger, and Anastasios Giakouminakis, assigned to Rapid7, LLC, the disclosures of which are incorporated herein, in their entirety, by reference.

In embodiments, once the software and hardware resources are identified, the security tool 102 can be configured to compare the details of the software resources and the details of the hardware resources to a vulnerability database 108. The vulnerability database 108 can be configured to store a record of known vulnerabilities for various types of known software resources and hardware resources. The security tool 102 can be configured to compare the identified details of the software resources and hardware resources of the computing system 104 and/or the VMs 114 to the vulnerability database 108 in order to identify vulnerabilities in the computing system 104 and/or the VMs 114. The vulnerability database 108 can be configured according to any type of proprietary or open-source database format or scheme.

In embodiments, once a vulnerability is identified, the security tool 102 can be configured to determine a risk level associated with the identified vulnerability. The risk level can be any type of textual description and/or alphanumeric identifier that describes the possible threat to an asset, which the vulnerability poses. The security tool 102 can be configured to base the risk level for an identified vulnerability on any combination of the six base vectors of the CVSS, the optional vectors of the CVSS, and/or additional factors that apply to a particular type of vulnerability and threat posed by a vulnerability. A complete description of the CVSS can be found in *CVSS, A Complete Guide to the Common Vulnerability Scoring System Version* 2.0 by Peter Mell, Karen Scarfone, and Sasha Romanosky, June 2007, which is incorporated herein in its entirety by reference.

To determine the risk level, the security tool 102 can be configured to include rules and mathematical algorithms that define how each factor will be used and weighed to determine the risk level. One skilled in the art will realize that the security tool 102 can utilize any types of rules, mathematical algorithms, and any weight for the factors to calculate a risk for the identified vulnerability. While several examples for determining the risk level are described above and below, one skilled in the art will realize that the security tool 102 can be configured to base the risk level for an identified vulnerability on any combination of the factors associated with the vulnerabilities. Accordingly, the security tool 102 can be configured to include any rule that utilizes one or more of the factors and any weight for the factors to determine the risk level.

In embodiments, the security tool 102 can be configured to utilize the additional factors in addition to the base and optional vectors of the CVSS to determine the risk level. The following is a description of the additional factors that can be utilized by the security tool 102.

Virtualization

Vulnerabilities, e.g. hypervisor vulnerabilities, associated with VMs, such as VMs 114, represent greater risk, given that successful exploitation of a hypervisor vulnerability can give an attacker access to all virtual machines on a given hypervisor. In embodiments, in determining the risk level, the security tool 102 can be configured to utilize an additional factor that represents whether the vulnerability is associated with VMs. The value of the additional factor can be related to the type of vulnerability associated with the VMs. For example, if the vulnerability is a hypervisor vulnerability, the value of the additional factor can be related to the number of VMs affected by the vulnerability. Likewise, the value of the additional factor can be a static value that represents the vulnerability is associated with VMs. One skilled in the art will realize that the security tool 102 can utilize any value for the additional factor for the vulnerabilities associated with VMs that indicates a higher risk for the vulnerability associated with the VMs and/or the level of higher risk depending on the type of the vulnerability associated with the VMs.

Malicious Software ("Malware")

80% of malware attacks use a finite number of known vulnerabilities. For entities that are concerned with malware infection, factoring in the likelihood that a vulnerability would be used by malware is an important and material input to the measure of risk. In embodiments, when the vulnerability is identified, the security tool 102 can identify whether the identified vulnerability is associated with known malware and/or is associated with exploit kits used for the creation of malware. To identify whether the identified vulnerability is associated with known malware, the security tool 102 can be configured to maintain a record of known malware associated with the vulnerabilities and/or a record of exploit kits used for the creation of malware in the vulnerability database 108. In determining the risk level, the security tool 102 can be configured to utilize an additional factor that represents whether the vulnerability is associated with malware. The value of the additional factor can be a static value that represents the vulnerability is associated with malware. Likewise, value of the additional factor can be a dynamic value that represents the importance of the existence of the malware to the asset. One skilled in the art will realize that the security tool 102 can utilize any value for the additional factor for the vulnerabilities associated with malware that indicates a higher risk for the vulnerability associated with the malware and/or levels of higher risk depending on potential impact of the vulnerability associated with the malware on the asset.

Exploitation

The known existence and quality of a given exploit for a vulnerability also affects risk. Theoretical vulnerabilities with no known exploits are fundamentally different than real-world vulnerabilities with known, tested exploits. In addition, exploit quality varies dramatically, and also affects risk. In embodiments, in determining risk level, the security tool 102 can be configured to utilize an additional factor that represents the exploitability of the vulnerability. Examples of utilizing the exploitability in determine the risk level can be found in Methods and Systems for Testing and Analyzing Vulnerabilities of Computing Systems Based on Exploits of the Vulnerabilities, U.S. patent application Ser. No. 12/750,031, U.S. Patent Application Publication No. 2011-0191854, invented by Anastasios Giakouminakis, Chad Loder, Corey E. Thomas, and HD Moore, assigned to Rapid7, LLC, the disclosures of which are incorporated herein, in their entirety, by reference.

In embodiments, to determine whether a vulnerability is exploitable, the security tool 102 can be configured to communicate with security forums websites, security experts, and the like. For example, the security tool 102 can be configured to search and scan security forums and websites, via the network 106, to determine whether a vulnerability is exploitable.

Classification of Assets

Assets can be assigned a classification that will automatically assign specific values that drive the risk associated with vulnerabilities detected on that asset. The classification can describe the importance of the asset (e.g. importance of confidentiality, integrity, or availability) to the entity controlling the asset, the cost to mitigate vulnerabilities, and/or the cost to deal with consequences of an attack on the asset. In embodiments, in determining the risk level, the security tool 102 can be configured to utilize an additional factor that represents the classification of the asset. In embodiments, the security tool 102 can be configured to determine the classification based on metrics that describe the value of the asset. The metrics can include competitive advantage loss due to an attack on the asset, business loss due to an attack on the asset, intrinsic value of compromised data due to an attack on the asset, productivity loss either due to the direct impact of an attack or lost productivity reacting to the attack, reputation loss due to an attack, and legal impact, e.g. files and judgments, due to an attack. The security tool 102 can be configured to automatically determine the classification based on predefined classifications for different types of asset. Likewise, the security tool 102 can be configured to determine the classification based on input from a user. While the above description lists several metrics that can be used to classify an asset, one skilled in the art will realize that the metrics can include data that represents the importance and value of an asset.

Vulnerabilities in Connected Assets

Often an asset can be connected to another asset that has a vulnerability, which can affect the asset. In embodiments, when the vulnerability is identified, the security tool 102 can be configured to identify whether other assets are connected to the asset and whether the other assets contain vulnerabilities. To identify the other assets and vulnerabilities, the security tool 102 can maintain a record of other assets connected to the asset and the vulnerabilities identified in the other assets in the vulnerability database 108. In determining the risk level, the security tool 102 can be configured to utilize an additional factor that represents whether the other assets contain a vulnerability and the impact of the vulnerability on the asset. The value of the additional factor can be a static value that represents a vulnerability exists on other assets connected to the asset. Likewise, value of the additional factor can be a dynamic value that represents the risk of the vulnerability and/or the proximity of the connection between the asset and the other assets. One skilled in the art will realize that the security tool 102 can utilize any value for the additional factor for the vulnerabilities on the other assets that indicates a higher risk for the vulnerability on the other assets connected to the asset and/or levels of higher risk depending on potential impact of the vulnerability on the asset.

In embodiments, once the vulnerabilities are identified and the risk level determined, the security tool 102 can be configured to notify a user of the vulnerabilities. For example, the security tool 102 can be configured to provide a report 110 to a user of the security tool 102 and/or a user of the computing system 104. The report 110 can be configured to include the identified vulnerabilities, identified exploits, the risk level, and other relevant information. The security tool 102 can be configured to provide the report 110 in any type of format that is accessible by a user of the security tool 102 and/or the computing system 104. For example, the security tool 102 can be configured to create and output a graphical user interface (GUI) that includes the report 110. Likewise, the security tool 102 can be configured to output the report 110 in other formats, such as electronic mail (email), Hyper Text Markup Language (HTML) document, text or word processing document, and the like. Likewise, the security tool 102 can be configured to notify the user in other formats such as user interface (UI) alerts and notices.

Figure 2:
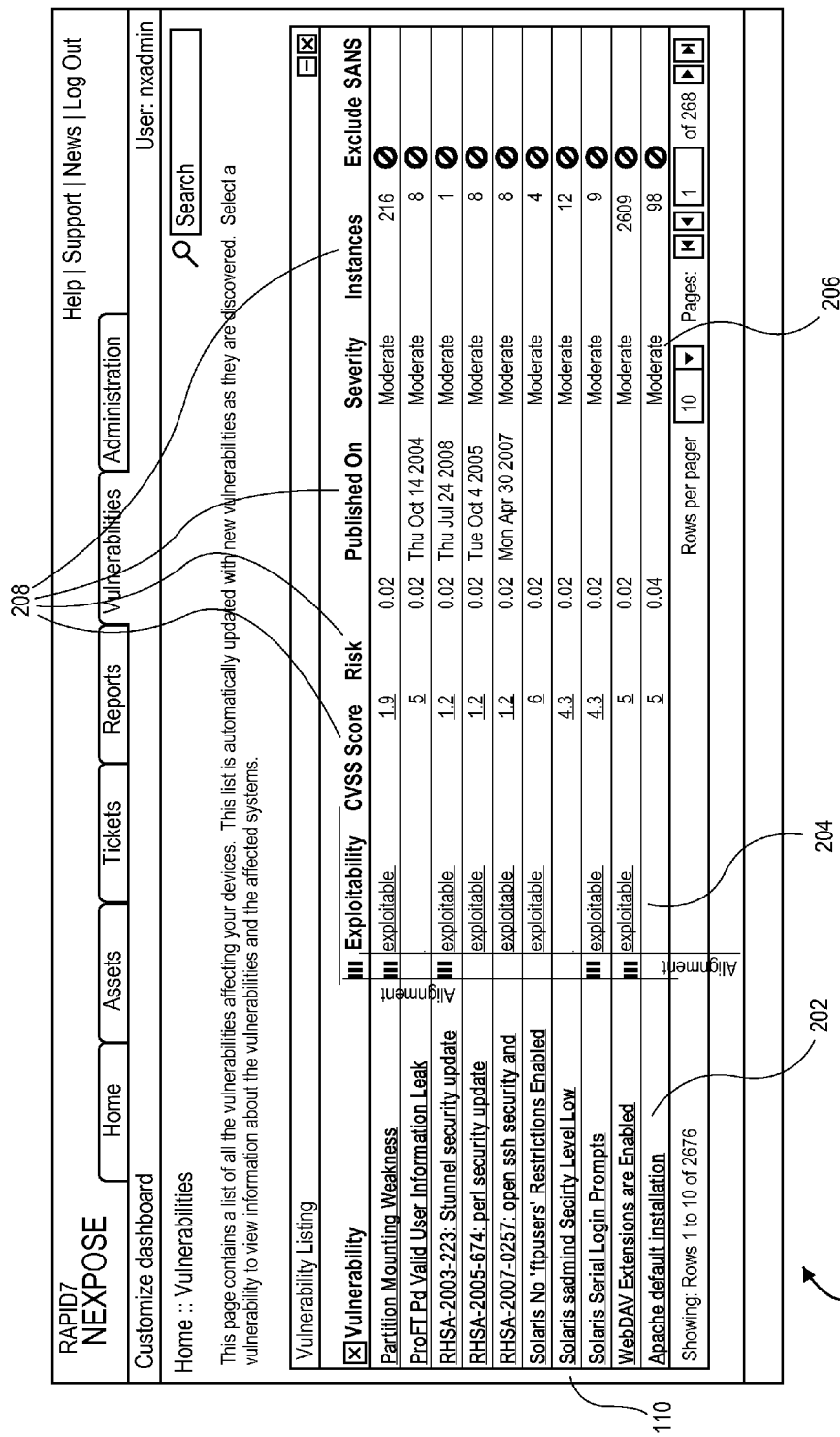
FIG. 2 is exemplary diagrams of interfaces generated by the security tool for providing reports, according to various embodiments.

FIG. 2A illustrates an exemplary GUI 200 for displaying the report 110. The GUI 200 can be a GUI utilized to communicate with the security tool 102 in order to control the security tool 102 and receive the report 110. As illustrated, the GUI 200 can display the report 110. The report 110 can be configured as a table that includes a column 202 for displaying the vulnerabilities identified. The column 202 can include the identification of each identified vulnerability (e.g. name). This identification can also be a link that allows the user to retrieve more information about the vulnerability, for example, more information stored in the vulnerability database 108.

The report 110 can also include a column 204 that identifies whether an identified vulnerability is exploitable, i.e. whether an exploit exists. In the report 110, the column 204 can include a link to the details of identified exploits stored in the vulnerability database 108. The link can be configured to allow a user of the security tool 102 and/or computing system 104 to view the details of the identified exploits such as a description of the vulnerabilities, a description of the exploits, the rank of the exploits, and the like.

In embodiments, the security tool 102 can be configured to also determine an overall risk for an asset. The overall risk is a measure that describes the total risk for the asset due to vulnerabilities on the asset, vulnerabilities on other assets that might affect the asset, and additional factors associated with the asset. Additionally, the overall risk can also incorporate the value of the asset, for example, the importance of the asset, the cost of mitigating a vulnerability, the cost of dealing with an attack due to a vulnerability, and the like. Thus, the overall risk can provide a global view of the risk that is associated with an asset. The overall risk can be any type of textual description and/or alphanumeric identifier that describes the risk to an asset.

To determine the overall risk, the security tool 102 can be configured to include rules and mathematical algorithms that define how the risk level of the vulnerabilities and each additional factor will be used and weighed to determine the overall risk. One skilled in the art will realize that the security tool 102 can utilize any types of rules, mathematical algorithms, and any weight for the factors that calculate an overall risk for an asset. While several examples for determining the risk level are described above and below, one skilled in the art will realize that the security tool 102 can be configured to base the overall risk for an asset on any combination of the factors associated with the asset. Accordingly, the security tool 102 can be configured to include any rule that utilizes one or more of the factors and any weight for the factors to determine the overall risk.

In embodiments, the security tool 102 can be configured to determine the overall risk based on the risk level of vulnerabilities on an asset and additional factors described below.

Classification of Assets

Assets can be assigned a classification that will automatically assign specific values that drive the overall risk associated with the asset. The classification can describe the importance of the asset (e.g. importance of confidentiality, integrity, or availability) to the entity controlling the asset, the cost to mitigate vulnerabilities, and/or the cost to deal with consequences of an attack on the asset. In embodiments, in determining overall risk, the security tool 102 can be configured to utilize an additional factor that represents the classification of the asset. In embodiments, the security tool 102 can be configured to determine the classification based on metrics that describe the value of the asset. The metrics can include competitive advantage loss due to an attack on the asset, business loss due to an attack on the asset, intrinsic value of compromised data due to an attack on the asset, productivity loss either due to the direct impact of an attack or lost productivity reacting to the attack, reputation loss due to an attack, and legal impact due, e.g. files and judgments, to an attack. The security tool 102 can be configured to automatically determine the classification based on predefined classifications for different types of assets. Likewise, the security tool 102 can be configured to determine the classification based on input from a user. While the above description lists several metrics that can be used to classify an asset, one skilled in the art will realize that the metrics can include data that represents the importance and value of an asset.

Detection Confidence

Depending on the environment and the credentials supplied to the security tool 102, vulnerabilities can be detected with varying degrees of confidence. Likewise, the more frequently an asset is scanned, the more accurate information an entity has about its vulnerabilities and the possibilities of attack. Less frequently scanned assets present greater uncertainty, and thus less confidence in their current perceived risk posture. If an asset with less frequent scans has higher exposure to the threat environment, then it must be regarded with greater deference. In embodiments, in determining overall risk, the security tool 102 can be configured to determine an additional factor that describes a confidence level in identifying the vulnerabilities in an asset. The confidence level can be based on a metrics such as the type of asset scanned, the environment of the asset, the credentials used to identify the vulnerabilities, and the frequency with which an asset is scanned, and the like. One skilled in the art will realize that the security tool 102 can utilize any metric for the additional factor that indicates levels of confidence depending on the conditions under which the vulnerabilities were identified.

Vulnerabilities in Connected Assets

Often an asset can be connected to another asset that has a vulnerability that can affect the asset. In embodiments, when the vulnerability is identified, the security tool 102 can be configured to identify whether other assets are connected to the asset and whether the other assets contain vulnerabilities. To identify the other assets and vulnerabilities, the security tool 102 can be configured to maintain a record of other assets connected to the asset and the vulnerabilities identified in the other assets in the vulnerability database 108. In determining the overall risk, the security tool 102 can be configured to utilize an additional factor that represents whether the other assets contain a vulnerability and the impact of the vulnerability on the asset. The value of the additional factor can be a static value that represents a vulnerability exists on other assets connected to the asset. Likewise, value of the additional factor can be a dynamic value that represents the risk of the vulnerability and/or the proximity of the connection between the asset and the other assets. One skilled in the art will realize that the security tool 102 can utilize any value for the additional factor for the vulnerabilities on the other assets that indicates a higher risk for the vulnerability on the other assets connected to the asset and/or levels of higher risk depending on potential impact of the vulnerability on the asset.

Entity Interdependencies

Entities such as organizations do not exist in a vacuum. Entities directly integrate with each other or indirectly impact each other. When two organizations of certain risk profiles integrate, each entity's risk posture potentially poses a threat to the other's. Interactions between organizations with known risks can be assessed and factored into the individual and collective risk assessments. Furthermore, even when entities do not interact directly with each other at an information technology level, a loss event in a single entity within a business community can have a significant business impact to the rest of the community. A holistic view of the interconnectedness of entities drives the assessment of entity risk, and the risk of a market segment as a whole.

In embodiments, in determining the overall risk, the security tool 102 can be configured to determine an additional factor that describes the external risk to an asset. The external risk can be based on metrics such as the overall risk of entities connected to the asset, the vulnerabilities in the entities connected to the asset, the level of connection between the entities and the asset, and the like. One skilled in the art will realize that the security tool 102 can utilize any metric for the additional factor for external risk that indicates levels of connection between entities and the asset and/or the risk contributed by entities.

Dormant and Mitigated Risk

In current risk models, all known vulnerabilities are treated equally, even if the vulnerable asset is known not to be present in the environment. Risk associated with assets known to be inactive does contribute to risk, but this risk should be quantified and qualified differently. For example, a particular asset can be connected to another vulnerable asset that is currently active, but the risk of the vulnerable assets can still contribute to the overall risk. Further, when a vulnerability is detected, security operations can elect to: a) remediate a vulnerability (if a patch or workaround exists); b) mitigate the vulnerability through some other method, such as: put in a compensating control, or transfer the risk (cyber insurance); c) classify a risky configuration as acceptable use, or otherwise accept the risk. Options (b) and (c) either do not entirely reduce the risk associated with the vulnerability, or they do not reduce the risk at all. Existing risk scoring methods, however, are all-or-nothing: they do not allow for partial mitigation or for acceptable risk. That is, if a vulnerability is classified as accepted, it disappears entirely from the risk. However, when a vulnerability is not entirely removed, there remains some residual risk that can be quantified and which must be considered when assessing an entity's risk posture.

In embodiments, in determining overall risk, the security tool 102 can be configured to determine an additional factor that describes a residual risk due to inactive assets or vulnerabilities and/or mitigated or partially mitigated vulnerabilities. The residual risk can be based on metrics related to inactive assets or vulnerabilities, such as the likelihood the inactive assets or vulnerabilities will become active, the frequency with which the inactive assets or vulnerabilities will become active, and the like. The residual risk can also be based on metrics related to mitigated or partially mitigated vulnerabilities, such as the risk level of the vulnerability, the effectiveness of the remediation, the classification of the asset, and the like. One skilled in the art will realize that the security tool 102 can utilize any metric for the additional factor for residual risk that indicates levels of risk still remaining after an asset and/or vulnerability is inactive, and/or after a vulnerability is mitigated or partially mitigated.

In embodiments, once the overall risk is determined, the security tool 102 can be configured to notify a user of the overall risk. For example, the security tool 102 can be configured to provide the report 110 to a user of the security tool 102 and/or a user of the computing system 104 that includes the overall risk. The report 110 can be configured to include the identity of the asset, the identified vulnerabilities, the risk level, the overall risk, and other relevant information. The security tool 102 can be configured to provide the report 110 in any type of format that is accessible by a user of the security tool 102 and/or the computing system 104. For example, the security tool 102 can be configured to create and output a GUI that includes the report 110. Likewise, the security tool 102 can be configured to output the report 110 in other formats, such as email, HTML document, text or word processing document, and the like. Likewise, the security tool 102 can be configured to notify the user in other formats such as UI alerts and notices.

As described above, the security tool 102 can be configured to determine the overall risk for an asset. Likewise, the security tool 102 can be configured to determine the overall risk for an entity. The overall risk for the entity can encompass all the assets of the entity, such as the computer systems 104 and/or the virtual machines 114. The security tool 102 can be configured to determine the overall risk for an entity utilizing the processes and factors described above.

Once the risk level and/or overall risk are determined, the security tool 102 can be configured to perform other processes with the risk level and/or overall risk. The security tool 102 can be configured to determine a risk level and/or overall risk or a change in the risk at a future time. Likewise, the security tool 102 can be configured to determine a likelihood of a different risk level and/or overall risk at a future time. The security tool 102 can be configured to base the risk level and/or overall risk, change in the risk, or the likelihood at a future time on several factors described below.

Elastic Computing

If vulnerable assets are known to come online or go offline in accordance with a schedule, the risk associated with that schedule can be predicted. This is especially useful in elastic computing environments where many identical VMs, such as VMs 114, will come online in accordance with predictable loads. The organization's realtime risk can be forecast as a result. In embodiments, the security tool 102 can be configured to determine a future risk level and/or future overall risk. The future risk level and/or future overall risk can be based on metrics related to the schedule of activity and inactivity in the asset. One skilled in the art will realize that the security tool 102 can utilize any metric for future risk level and/or future overall risk that indicates levels of risk in the future based on the activity and inactivity of an asset.

Threat Community Activity

Activity in the threat community, such as security research, Zero Day Initiative advisories, increased instances of specific attack types, and known/rumored intentions from hacktivist groups or government threat agents, can be used to inform risk assessment by increasing the profile of certain vulnerabilities on certain types of assets. In embodiments, the security tool 102 can be configured to determine a future risk level and/or future overall risk based on information for security forums, websites, and experts. The security tool 102 can be configured to communicate with security forums and websites, security experts, and the like. For example, the security tool 102 can be configured to search and scan security forums and websites, via the network 106, to determine whether an increase in activity concerning a vulnerability and/or current information about vulnerabilities.

Organizational Context

Complimentary to Threat Community Activity, the activities of an entity can be used to assess the organization's risk. Specifically, the nature of the entity's business can inform the attractiveness of certain assets, based on their function and the type of data stored on them, which in turn can affect both the likelihood and impact of an attack on those targets. Similarly, the nature of an entity's business can be used to understand the probability of specific types of threats. In embodiments, the security tool 102 can be configured to determine future risk level and/or future overall risk based on information about the entity. The information about the entity can include business activities of the entity, attractiveness of assets of the entity, based on their function and the type of data stored on them, and the like. One skilled in the art will realize that the security tool 102 can utilize any metric for future risk level and/or future overall risk that indicates the nature of an entity's business.

In addition to the processes described above, the security tool 102 can be configured to determine a priority of remediation of vulnerabilities based on any combination of the risk level, the overall risk, and/or additional factors that are associated with the entity. For example, the entire purpose of assessing risk is to drive action to mitigate that risk which is above an organization's acceptable risk threshold. The additional factors that can be used to prioritize the remediation of vulnerabilities are described as follows.

Cost to Remediate/Remediation Consolidation

All remediation takes time and therefore has a cost associated with it. Many remediation actions can solve multiple vulnerabilities simultaneously; assessing the cost of remediation should account for multi-vulnerability mitigation. In embodiments, the security tool 102 can be configured to determine a priority of remediation of vulnerabilities based on any combination of the risk level, the overall risk, and/or cost of remediation.

Uptime Requirements

Some assets can only be brought down at specific times without having negative impacts to the organization's business. The business value of the asset's uptime/downtime must be weighed against the risk of the vulnerabilities detected on it to ascertain the criticality/priority of their remediation. In embodiments, the security tool 102 can be configured to determine a priority of remediation of vulnerabilities based on any combination of the risk level, the overall risk, and/or uptime requirements.

Risk Aggregation and Risk Thresholds

Prioritization of risk is more than just comparing sums of numbers. Vulnerability A on an asset that is computed to be 10,000 times riskier than another Vulnerability B does not necessarily pose equal risk to the Vulnerability found on 10,000 equivalent assets. As an analogy, consider a region experiencing 10,000 3.0 magnitude earthquakes over the course of 10 years versus experiencing a 7.0 earthquake once in that same period. The threshold of risk tolerance has not been exceeded by the probability of smaller loss events, even if they are numerous; but only a single high-impact event that exceeds an organization's risk threshold can be catastrophic. Risk values are not simple scalars and should be aggregated with risk tolerance in mind. In embodiments, the security tool 102 can be configured to determine a priority of remediation of vulnerabilities based on any combination of the risk level, the overall risk, and/or risk aggregation in relation to risk thresholds.

In embodiments, once the priority of remediation is determined, the security tool 102 can be configured to notify a user of the priority of remediation. For example, the security tool 102 can be configured to provide the report 110 to a user of the security tool 102 and/or a user of the computing system 104 that includes the priority of remediation. The report 110 can be configured to include the identity of the asset, the identified vulnerabilities, the risk level, the overall risk, the priority of remediation, and other relevant information. The security tool 102 can be configured to provide the report 110 in any type of format that is accessible by a user of the security tool 102 and/or the computing system 104. For example, the security tool 102 can be configured to create and output a GUI that includes the report 110. Likewise, the security tool 102 can be configured to output the report 110 in other formats, such as email, HTML document, text or word processing document, and the like. Likewise, the security tool 102 can be configured to notify the user in other formats such as UI alerts and notices.

In embodiments, as described above, the security tool 102 can be configured as an application program that is capable of being stored on and executed by the computing systems of the environment 100. For example, the security tool 102 can be an application program such as NeXpose™ from Rapid7, LLC. The security tool 102 can be written in a variety of programming languages, such as JAVA, C++, Python code, Visual Basic, hypertext markup language (HTML), extensible markup language (XML), and the like to accommodate a variety of operating systems, computing system architectures, etc.

In embodiments, as described herein, the security tool 102 can be implemented and executed on any of the computing systems of environment 100 in order to test and analyze the security of a computing system 104. For example, the security tool 102 can be implemented and executed on a computing system 104 that is being tested. Likewise, the security tool 102 can be implemented and executed on a remote computing system 112. In this example, the security tool 102 can remotely test and analyze the computing systems 104 via the network 106. When configured as an application program, the security tool 102 can be stored on any type of computer readable storage medium, such as hard drives, optical storage, system memory, and the like, of the computing systems of the environment 100.

Figure 3:
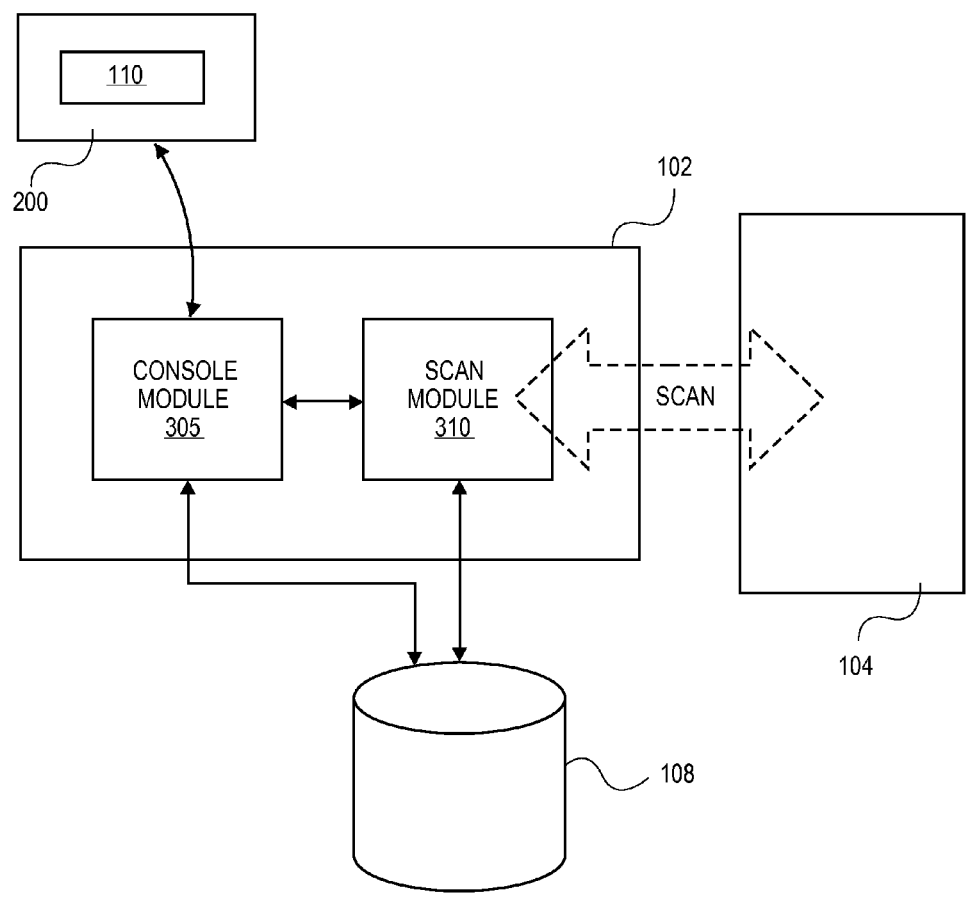
FIG. 3 is a block diagram of an exemplary configuration of the security tool, according to various embodiments.

FIG. 3 is a block diagram of an exemplary configuration of the security tool 102. As illustrated, the security tool 102 can include a console module 305 and scan module 310. While FIG. 3 illustrates various components of the security tool 102, one skilled in the art will realize that existing components can be removed or additional components added.

In embodiments, the console module 305 can be configured to provide an interface to the security tool 102. The console module 305 can be configured to generate interfaces that allow a user to initiate the security tool 102, operate the security tool 102, and receive information generated by the security tool 102, such as report 110 or other notification. To achieve this, the console module 305 can be configured to include the necessary logic, commands, instructions and routines to generate and communicate with GUIs and/or command-line interfaces. Likewise, the console module 305 can be configured include the necessary logic, commands, instructions and routines to output information in other formats, such as email, HTML document, text or word processing document, and the like.

In embodiments, the console module 305 can communicate with the scan module 310. The scan module 310 can be configured to perform the processes of identifying the vulnerabilities of the computing systems 104. To achieve this, the scan module 310 can be configured to include the necessary logic, commands, instructions and routines to scan the computing systems 104 in order to identify the hardware resources and the software resources of the computing systems 104. Likewise, the scan module 310 can be configured to include the necessary logic, commands, instructions and routines to search the vulnerability database 108 and to retrieve the information from the vulnerability database 108 in order to identify the vulnerabilities of the computing systems 104 and to report the identified vulnerabilities and exploits to the console module 305.

In embodiments, the console module 305 can be configured to determine the risk level utilizing the process described herein. To achieve this, the console module 305 can be configured to include the necessary logic, commands, instructions and routines to determine the risk level based on the factors as described above. Likewise, the console module 305 can be configured to communicate with the vulnerability database 108 in order to retrieve information about the vulnerabilities to provide the information to the user of the security tool 102. Likewise, the console module 305 can be configured to include the necessary logic, commands, instructions and routines to determine the overall risk based on the factors as described above.

In embodiments, as illustrated in FIG. 3, the console module 305 and the scan module 310 can be implemented in a single application program capable of executing on the computing systems of environment 100. Likewise, the console module 305 and the scan module 310 can be implemented as separate application programs that are capable of executing on separate computing systems of the environment 100. Additionally, the console module 305 can be configured to communicate with multiple scan modules 310.

In embodiments, as illustrated in FIG. 1, the security tool 102 can be configured to include the vulnerability database 108. Likewise, the vulnerability database 108 can be stored in a repository associated with any of the computing systems of the environment 100 and accessed remotely by the security tool 102. The repository can be stored on any type of computer readable storage medium, such as hard drives, optical storage, system memory, and the like, of the computing systems of the environment 100. While FIG. 1 illustrates a single vulnerability database 108, one skilled in the art will realize that the vulnerability database 108 can comprise multiple databases. For example, the vulnerability database 108 can include a database for vulnerabilities and a database for exploits.

In embodiments, as described above, the security tool 102 can be configured to test a single computing system 104 for security threats. Likewise, the security tool 102 can be configured to scan and test multiple computing systems 104, concurrently, for security threats.

Figure 4:
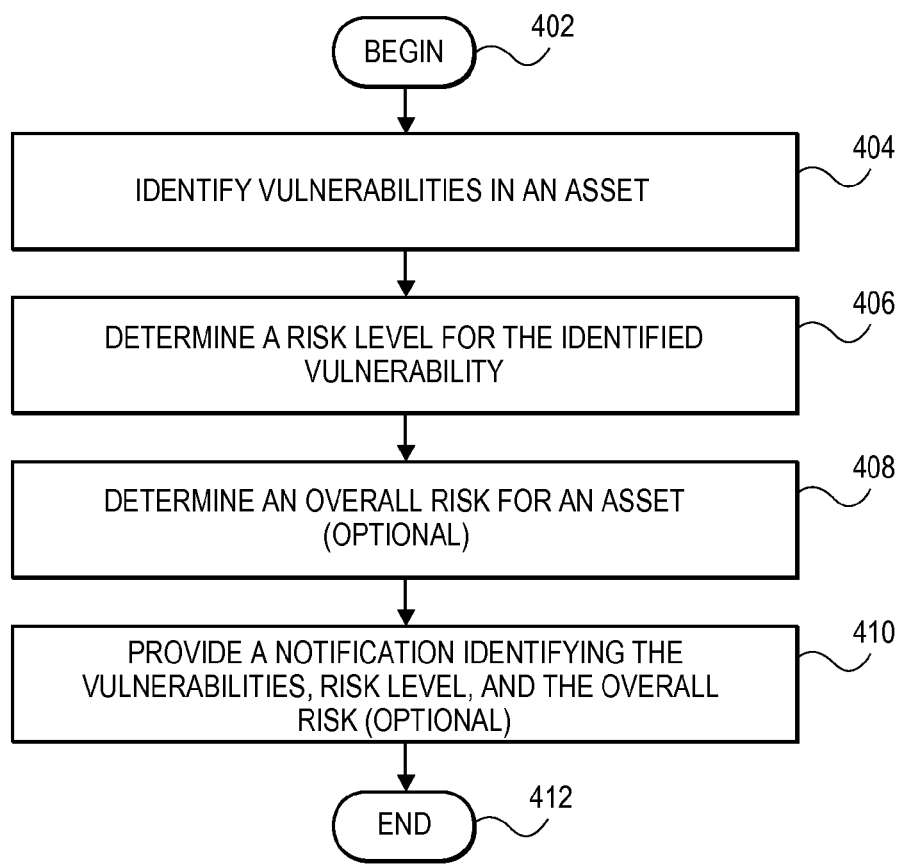
FIG. 4 is a flow diagram of exemplary processes performed by the security tool, according to various embodiments.

As mentioned above, the security tool 102 can be configured to test and analyze a computing system. FIG. 4 is a flow diagram that illustrates an exemplary process by which security tool 102 can determine risk in the environment 100. In 402, the process can begin.

In 404, the security tool 102 can identify vulnerabilities in an asset. The security tool 102 can examine the computing system 104 and/or the VMs 114 to identify the software resources and the hardware resources of the computing system 104. For example, the security tool 102 can scan the computing systems 104 in order to identify the details of the software resources of the computing systems (type of software installed, e.g. OS and application programs, version of the software installed, configuration of the software installed, etc.) and the details of the hardware resources (type of hardware, configuration of the hardware, etc.). Once the software and hardware resources are identified, the security tool 102 can compare the identified details of the software resources and hardware resources of the computing system 104 to the vulnerability database 108 in order to identify vulnerabilities in the computing system 104 and/or VMs 114.

In 406, the security tool 102 can determine a risk level for the identified vulnerabilities based on the base and optional vectors of the CVSS and based on the additional factors. The security tool 102 can base the risk level for an identified vulnerability on any combination of the factors associated with the identified exploits or other risk scoring systems. To determine the risk level, the security tool 102 can include rules that define how each factor will be used and weighed to determine the risk level. In 408, the security tool 102 can optionally determine an overall risk for an asset as described above.

In 410, the security tool 102 can provide a notification identifying the vulnerabilities, the risk level, and the overall risk (optional). For example, the report 110 can include the identified vulnerabilities, the risk level, the overall risk, and other relevant information. The security tool 102 can provide the report 110 in any type of format that is accessible by a user of the security tool 102 and/or the computing system 104.

In 412, the process can end, return to any point or repeat.

Figure 5:
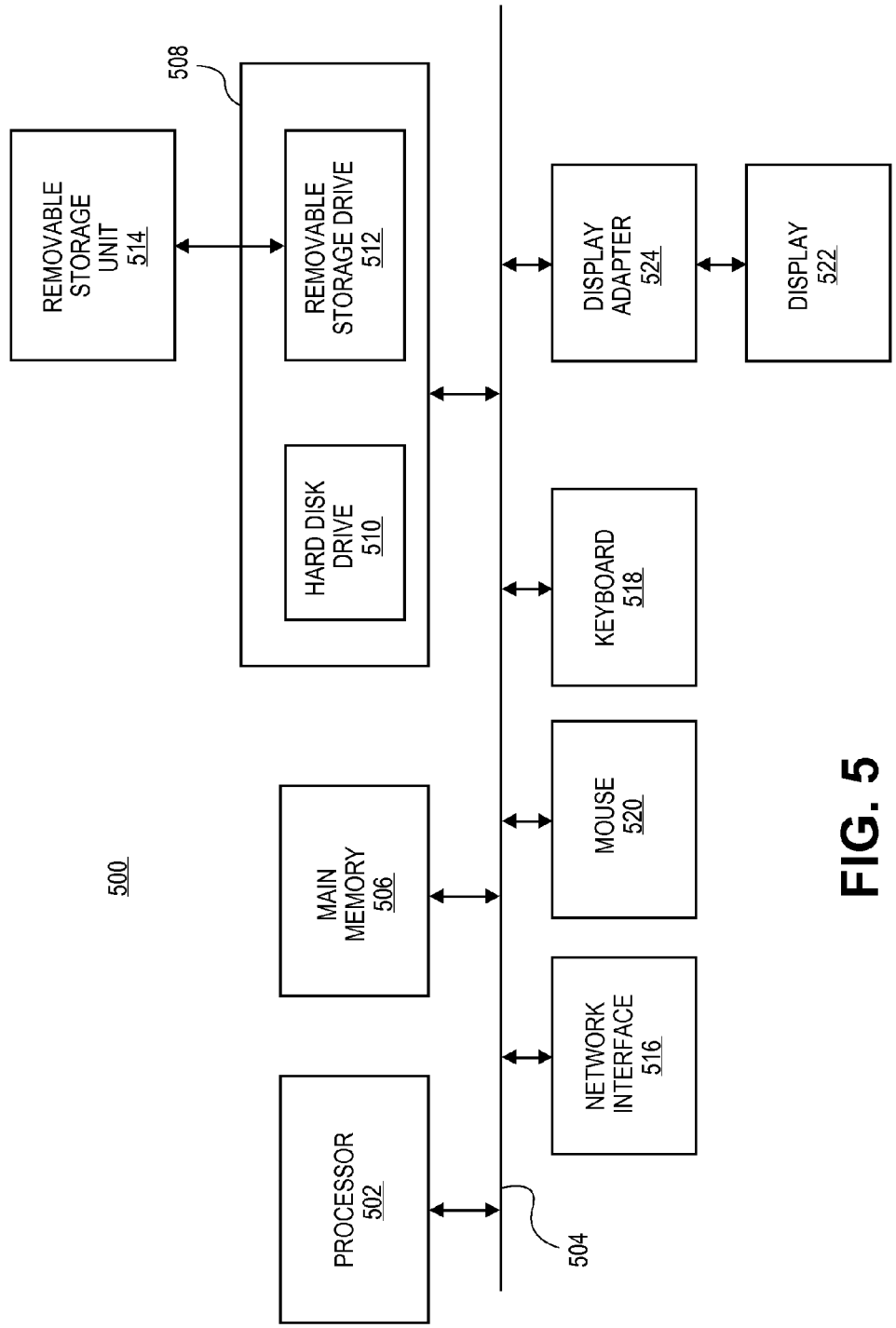
FIG. 5 is a block diagram of an exemplary computing system, according to various embodiments.

FIG. 5 illustrates an exemplary block diagram of a computing system 500 which can be implemented as the computing systems 104 and/or the computing system 112 according to various embodiments. In embodiments, the security tool 102 can be stored and executed on the computing system 500 in order to perform the process described above. Likewise, the security tool 102 can be stored and executed remotely and can be configured to communicate with the computing system 500 in order to perform the process described above. While FIG. 5 illustrates various components of the computing system 500, one skilled in the art will realize that existing components can be removed or additional components can be added.

As shown in FIG. 5, the computing system 500 can include one or more processors, such as processor 502 that provide an execution platform for embodiments of the security tool 102. Commands and data from the processor 502 are communicated over a communication bus 504. The computing system 500 can also include a main memory 506, for example, one or more computer readable storage media such as a Random Access Memory (RAM), where the security tool 102 and other application programs, such as an operating system (OS) can be executed during runtime, and can include a secondary memory 508. The secondary memory 508 can include, for example, one or more computer readable storage media or devices such as a hard disk drive 510 and/or a removable storage drive 512, representing a floppy diskette drive, a magnetic tape drive, a compact disk drive, etc., where a copy of a application program embodiment for the security tool 102 can be stored. The removable storage drive 512 reads from and/or writes to a removable storage unit 514 in a well-known manner. The computing system 500 can also include a network interface 516 in order to connect with the one or more networks 106.

In embodiments, a user can interface with the computing system 500 and operate the security tool 102 with a keyboard 518, a mouse 520, and a display 522. To provide information from the computing system 500 and data from the security tool 102, such as the report 110, the computing system 500 can include a display adapter 524. The display adapter 524 can interface with the communication bus 504 and the display 522. The display adapter 524 can receive display data from the processor 502 and convert the display data into display commands for the display 522.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for security testing, comprising:
    identifying a vulnerability in an asset;
    executing a security tool, using one or more processors, to determine whether the vulnerability is exploitable, wherein the determination whether the vulnerability is exploitable is based at least partially on information from one or more security sources;
    determining a risk level of the vulnerability based at least partially on whether the vulnerability is exploitable;
    determining a new risk level for a future time based at least partially on factors utilized to determine the risk level; and
    determining a remediation strategy for the vulnerability in the asset according to a determined priority of remediation of vulnerabilities based at least partially on any combination of the risk level, the new risk level, business importance, an overall risk, risk aggregation in relation to risk thresholds, cost of remediation, and/or uptime requirements; and
    determining a residual risk of the vulnerability based on an effectiveness of the remediation strategy.

2. The method of claim 1, the method further comprising: notifying a user of the vulnerability and the risk level.

3. The method of claim 1, wherein the asset comprises at least one of a physical computer system and a virtual machine.

4. The method of claim 1, the method further comprising:
    determining a future risk level based on historical fix rates of vulnerabilities.

5. The method of claim 1, the method further comprising:
    identifying that the vulnerability is utilized by a new malicious software program; and
    determining a new risk level of the vulnerability based at least partially on the vulnerability being utilized by the new malicious software program.

6. A system for security testing, comprising:
    a computer readable non-transitory storage medium storing instructions; and
    a processor configured to execute the instructions to perform the method of claim 1.

7. A computer readable non-transitory storage medium storing instructions that cause a processor to perform the method of claim 1.

8. A method for security testing, comprising:
    identifying a vulnerability in an asset;
    identifying that the asset is hosting virtual machines or that the asset is a virtual machine;
    identifying resources of the virtual machines or the virtual machine; and
    determining, using one or more processors, a risk level of the vulnerability based at least partially on the resources of the virtual machines or the virtual machine;
    executing a security tool, using the one or more processors, to determine whether the vulnerability is exploitable, wherein the determination whether the vulnerability is exploitable is based at least partially on information from one or more security sources;
    determining a new risk level for a future time based at least partially on factors utilized to determine the risk level; and
    determining a remediation strategy for the vulnerability in the asset according to a determined priority of remediation of vulnerabilities based at least partially on any combination of the risk level, the new risk level, business importance, an overall risk, risk aggregation in relation to risk thresholds, cost of remediation, and/or uptime requirements.

9. The method of claim 8, the method further comprising: notifying a user of the vulnerability and the risk level.

10. The method of claim 8, the method further comprising:
    identifying a number of the virtual machines potentially affected by the vulnerability,
    wherein determining the risk level is further based at least partially on the number of virtual machines affected by the vulnerability.

11. The method of claim 8, the method further comprising:
    identifying that the vulnerability is located in one of the virtual machines; and
    identifying that the one of the virtual machines activates and deactivates according to a schedule, wherein determining the risk level is further based at least partially on the schedule.

12. A system for security testing, comprising:
a computer readable non-transitory storage medium storing instructions; and
a processor configured to execute the instructions to perform the method of claim 8.

13. A computer readable non-transitory storage medium storing instructions that cause a processor to perform the method of claim 8.

14. A method for security testing, comprising:
maintaining a record of vulnerabilities associated with asset resources;
identifying, using one or more processors, a vulnerability in an asset by:
analyzing at least one of software resources and hardware resources of the asset; and
comparing the at least one of software resources and hardware resources to the record of vulnerabilities;
executing a security tool, using the one or more processors, to determine whether the vulnerability is exploitable, wherein the determination whether the vulnerability is exploitable is based at least partially on information from one or more security sources;
determining a risk level of the vulnerability based at least partially on the vulnerability's ability to affect the asset;
determining a classification of the asset based at least partially on a value of the asset;
determining an overall risk to the asset based at least partially on the risk level of the vulnerability and the classification of the asset;
determining a new risk level for a future time based at least partially on factors utilized to determine the risk level; and
determining a remediation strategy for the vulnerability in the asset according to a determined priority of remediation of vulnerabilities based at least partially on any combination of the risk level, the new risk level, business importance, an overall risk, risk aggregation in relation to risk thresholds, cost of remediation, and/or uptime requirements.

15. The method of claim 14, the method further comprising:
notifying a user of at least one of the asset, the vulnerability, the risk level of the vulnerability, the classification of the asset, and the overall risk.

16. The method of claim 14, wherein the asset comprises at least one of a physical computer system and a virtual machine.

17. The method of claim 14, wherein the value of the asset comprises at least one of a value of data stored by the asset, competitive advantage loss associated with a failure of the asset, business loss associated with a failure of the asset, productivity loss associated with a failure of the asset, reputation loss associated with a failure of the asset, and a legal impact of a failure of the asset.

18. The method of claim 14, wherein the overall risk is further based at least partially on a classification of a second asset connected to the asset.

19. The method of claim 18, wherein the overall risk is further based at least partially on a level of connection between the asset and the second asset.

20. The method of claim 14, the method further comprising:
identifying a frequency that the asset is scanned for vulnerabilities, wherein the overall risk is further based at least partially on the frequency.

21. The method of claim 14, the method further comprising:
determining a confidence that all vulnerabilities on the asset were identified, wherein the overall risk is further based at least partially on the confidence.

22. The method of claim 14, the method further comprising:
identifying an entity that is associated with the asset, wherein the entity operates other assets connected to the asset; and
determining a risk profile of the entity, wherein the overall risk is further based at least partially on the risk profile of the entity.

23. The method of claim 14, the method further comprising:
determining a remediation to the vulnerability based on the overall risk.

24. The method of claim 14, the method further comprising:
determining whether the asset is inactive, wherein the overall risk is further based at least partially on the determination whether the asset is inactive.

25. The method of claim 14, the method further comprising:
determining a new overall risk for the future time based on the new risk level.

26. A system for security testing, comprising:
a computer readable non-transitory storage medium storing instructions; and
a processor configured to execute the instructions to perform the method of claim 14.

27. A computer readable non-transitory storage medium storing instructions that cause a processor to perform the method of claim 14.

* * * * *